United States Patent
Kenéz et al.

(10) Patent No.: US 7,770,688 B2
(45) Date of Patent: Aug. 10, 2010

(54) DEVICE FOR SUPERIMPOSING ROTATIONAL SPEEDS FOR A STEERING SYSTEM

(75) Inventors: Peter Kenéz, Budapest (HU); Christian Staudenmann, Mamishaus (CH); Gerhard Waibel, Bildstein (AT); Rene Allgäuer, Altach (AT)

(73) Assignee: Thyssenkrupp Presta AG, Eschen (LI)

( * ) Notice: Subject to any disclaimer, the term of this patent is extended or adjusted under 35 U.S.C. 154(b) by 606 days.

(21) Appl. No.: 11/664,781

(22) PCT Filed: Oct. 6, 2005

(86) PCT No.: PCT/CH2005/000587

§ 371 (c)(1),
(2), (4) Date: May 15, 2007

(87) PCT Pub. No.: WO2006/039825

PCT Pub. Date: Apr. 20, 2006

(65) Prior Publication Data

US 2008/0035412 A1    Feb. 14, 2008

(30) Foreign Application Priority Data

Oct. 16, 2004  (CH) .................................. 1704/04

(51) Int. Cl.
*B62D 5/04* (2006.01)
(52) U.S. Cl. ........................... 180/444; 180/443
(58) Field of Classification Search ............. 180/444, 180/443

See application file for complete search history.

(56) References Cited

U.S. PATENT DOCUMENTS

| | | | | |
|---|---|---|---|---|
| 6,012,347 A * | 1/2000 | Hasegawa | ............... | 74/388 PS |
| 6,029,768 A * | 2/2000 | Kiyosawa | ................... | 180/444 |
| 6,164,150 A * | 12/2000 | Shindo et al. | ............ | 74/388 PS |
| 6,199,654 B1 * | 3/2001 | Kojo et al. | .................. | 180/443 |
| 7,303,045 B2 * | 12/2007 | Yamamori et al. | .......... | 180/444 |
| 7,306,070 B2 * | 12/2007 | Kobayashi | .................. | 180/406 |
| 7,306,535 B2 * | 12/2007 | Menjak et al. | ................ | 475/29 |
| 2005/0155812 A1 * | 7/2005 | Yamamori et al. | .......... | 180/444 |

* cited by examiner

*Primary Examiner*—Lesley D Morris
*Assistant Examiner*—Michael R Stabley
(74) *Attorney, Agent, or Firm*—Notaro, Michalos & Zaccaria P.C.

(57) ABSTRACT

A rotational speed superimposing device for a vehicle steering system has an input shaft with an output shaft, which is oriented toward the input shaft in the axial direction thereof, and has a supporting arrangement, which positions the input shaft and the output shaft so that they are at least, in part, rotationally mounted. An auxiliary drive provided with a rotor, which is connected in a rotationally fixed manner to a wave generator, such as an oval disk on whose periphery an external toothed flexible ring is directly or indirectly mounted, this external toothing engaging in an internal gear at least at two opposite peripheral points. The supporting arrangement is fixed to the vehicle body. The output shaft is connected in a rotationally fixed manner to the internal gear, and the input shaft is connected in a rotationally fixed manner to the external toothed flexible ring. The input shaft and the output shaft are mounted so they freely rotate independently of one another.

17 Claims, 8 Drawing Sheets

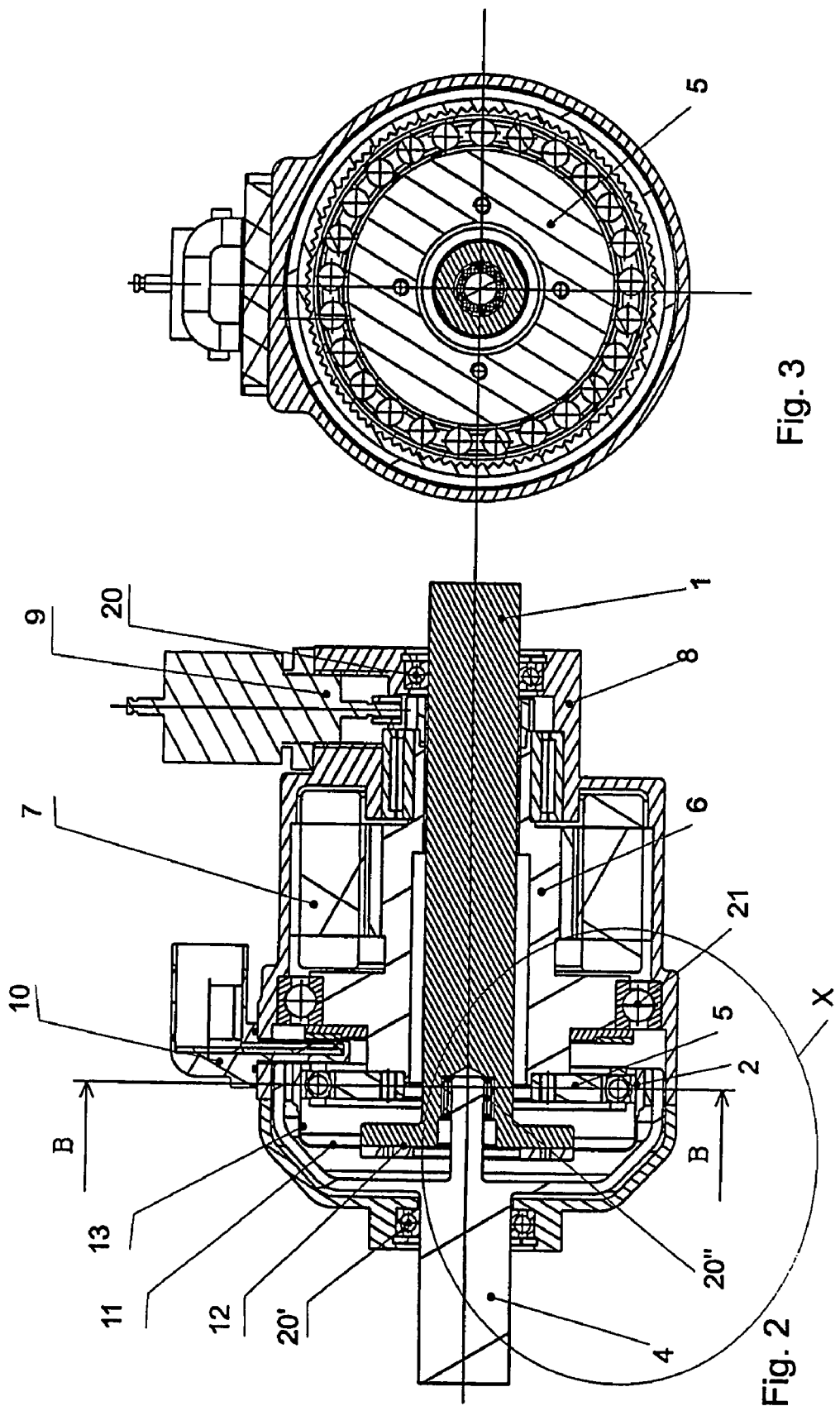

DEVICE FOR SUPERIMPOSING ROTATIONAL SPEEDS FOR A STEERING SYSTEM

FIELD AND BACKGROUND OF THE INVENTION

The invention relates to a device for the superposition of rotational speeds as well as to a method therefore.

The invention relates to a device with an auxiliary drive for the rotational speed superposition for a vehicle steering system in which, according to the determined operating state of the vehicle and the steering interventions desired by the driver, the superposition takes place of the control intervention on the steering wheel by the driver and the rotational angle of the auxiliary drive onto the steering movement of the wheels. Through the variable, adjustable or regulatable rotational speed superposition during the steering process, consequently, the control behavior of the vehicle can be optimally adapted to the various driving states. The function of a rotational speed superposition during the steering process is consequently decoupled with respect to a force coupling, rotational moment or torque coupling, such as serves in a servo steering to facilitate the control process, thus a separate independent process which fulfills another function.

Several such devices are already known in prior art. Apart from the application of planetary gearing for the superposition of the rotational angles, or the rotational speed, strain wave gearings, which are also known by the term harmonic drive gearing or pulsator gearing, are also employed.

EP 1 338 493 A1 and JP 2 003 306 155 A introduce a device for the rotational speed superposition for a steering system in which the rotational number superposition takes place with a strain wave gearing. The device therein is implemented integrally and rotationally with the steering shaft driven by the steering wheel and comprises a drive motor whose driving rotational speed is adjustable for the purpose of attaining the desired rotational speed superposition. In the introduced solution the housing is connected with the steering shaft and, consequently, rotates jointly with it. The motor unit disposed in the housing with harmonic drive gearing is consequently also disposed such that it rotates with the steering shaft. A similar disposition has moreover been introduced in DE 19 823 031 A1, corresponding to U.S. Pat. No. 6,164,150, and here the rotational speed superposition device is illuminated with the problematics of locking, in particular in the case of the forward and backward rotation on the steering wheel.

However, the solutions introduced in prior art have several disadvantages. First, the introduction of the electric energy for operating the driving motor must take place into a device which is rotationally supported with respect to the vehicle body. This requires considerable expenditures.

Further, a locking mechanism must be activated which, in the event of an error, for example in the case of a failure of the power supply, connects the input shaft with the output shaft of the device in order to ensure with certainty the control of the vehicle. The solution presented in prior art has the further disadvantage that while actuating the steering wheel the driver must always also set into motion the entire device with the housing for the rotational speed superposition. Through the moved masses, which are greater compared with steering systems without rotational speed superposition, handling becomes more difficult and inert. The responsiveness of the control of the motor vehicle is thereby impaired. A further disadvantage comprises that a large number of structural elements is necessary for the realization of such a rotational speed superposition, which entails higher accuracy requirements made of the parts and higher production costs as well as a decrease of the operating reliability of the configuration.

SUMMARY OF THE INVENTION

The present invention addresses the problem of eliminating the disadvantages of the above cited prior art. In particular, the task comprises providing a device for the variable rotational speed superposition for a steering system, in which the coupling-in of energy for operating the driving motor is simplified and consequently the economy and operating reliability is increased and therein simultaneously an improved control behavior is possible through the reduction of the moved masses and of the inertial behavior of the system.

The problem is solved according to the invention through the configuration according to the claims, as well as according to the method.

The rotational speed superposition device according to the invention for a vehicle steering system comprises an input shaft with an output shaft which, with respect to the input shaft, is oriented in the latter's axial direction, and a support configuration, which positions rotatably the input shaft and the output shaft, such that it is at least partially bearing supported. Further an auxiliary drive is provided with a rotor connected stationarily with a wave generator, in the simplest case an oval disk, on whose periphery directly or indirectly a flexible ring with outer toothing is supported, wherein its outer toothing meshes with an internal gear wheel at least in two opposing circumferential points. The support configuration is disposed stationarily on the vehicle body. The output shaft is connected torsion tight with the internal gear wheel and the input shaft is connected torsion tight with the flexible ring with outer toothing. The input shaft and the output shaft are supported such they are freely rotatable independently of one another.

Together with the flexible ring with outer toothing, the wave generator forms a so-called harmonic drive gearing, such as is produced for example by HARMONIC DRIVE AG, Hoehnbergstrasse 14, D-65555 Limburg a.d. Lahn in Germany. With respect to the definitions and implementations used here, reference is specifically made to the catalogue pages by said company with the descriptions of function.

It is understood that it is also possible to dispose said invented implementation inversely with respect to the harmonic drive gearing. This means that in this case the input shaft is connected torsion tight with the internal gear wheel and the output shaft is connected torsion tight with the outer-toothed flexible ring.

For the invented rotational speed superposition device advantageously rotational speeds in the range of 0 to 1200 angular degrees per second are superimposed onto the rotational speed of the input shaft and output to the output shaft. In individual cases even the superposition of a negative rotational speed is possible if the driver controls the vehicle inappropriately fast. Here couplings of rotational speeds of up to 1000 angular degrees per second are suitable, preferred values. However, higher values are also possible. The harmonic drive gearing should herein have a fixed reduction gear ratio in the range of 15 to 75. At this ratio a rotational speed range of the driving rotor in the range of 0 to 6000 revolutions per minute (RPM) is going to result, which is specified correspondingly variable through the controlled motor drive for the desired rotational speed superposition of the input shaft during the control process.

Such a disposition has several advantages. The disposition and the assignment of the elements of the gearing to one another necessitates that the superposition gearing, although it superimposes two driving rotational speeds onto an output rotational speed, has only two meshing corresponding toothings. The disposition of the gearing elements permits a very high gear transmission ratio between the rotational speed of the rotor of the auxiliary drive and the output shaft. Transmissions in the range of 50:1 are here entirely conventional values. Due to this high transmission ratio, the superposition gearing, in the event of power supply failure of the auxiliary drive, which is preferably an electric motor, can already transmit a certain torque without locking. The braking effect of the non-driven electric motor is increased, in the example 50-fold, with the corresponding gear transmission ratio. With usual braking moments of 0.1 Nm, in this way moments of 5 Nm can already be transmitted from the steering wheel to the input shaft. In the event that the steering assistance is in function, higher moments are rarely to be transmitted. In particular during fast driving in which the risk is disproportionally higher, the moments to be controlled by the superposition device are relatively small. Through a minimal increase of the friction, this value can still be increased correspondingly.

Nevertheless, in practice a locking mechanism can advantageously be provided. According to the invention the locking mechanism can be formed very simply. It suffices to dispose a simple locking between the rotor of the auxiliary drive and the housing. Therewith the locking advantageously does not need to mesh into the toothings.

Only a relatively minimal locking moment is therein required in comparison to the moment to be transmitted from the steering wheel onto the input shaft. It becomes thereby even possible to prefer the realization of the locking through a frictional closure. However, for reasons of security, positive locking is going to be preferred. However, the strength requirements made of the locking mechanics are low, due to the low required locking moment. Due to the high rotational speed transmission between rotor and output shaft, in an extreme case an uncontrolled turning out of position of the rotor can be permitted for a large angular range, for example up to 50°, until the locking snaps in. The steering angle would in this case only be falsified for example by approximately 1°. As a consequence the locking can be formed simply and reliably by means of positive locking through the engagement of a pin into a bore. Through a basically risk-free large displacement angle of the rotor with respect to the housing, relatively few and large indentations may be provided on the circumference of the rotor, which leads to constructionally simple formation feasibilities.

It is of advantage to form the support configuration as an at least partially closed housing. The vehicle body-stationary disposition of the support configuration or of the housing permits a very simple and failure-secure electric interconnection of the system to the vehicle's electronic circuitry. A conceivably required locking mechanism can also be disposed and activated in simple manner. For example, alternatively to the preferred electric activation, a hydraulic or electrohydraulic activation mechanism is feasible. In the present configuration according to the invention the auxiliary drive essentially only effects the desired variable rotational angle or rotational speed superposition between input and output shaft of a steering arrangement. Additional coupling of a steering force, such as is realized in a servo steering arrangement, does not take place in the present invented configuration.

It is, however, advantageous to combine a steering force augmentation with the invented rotational speed superposition device. For this case, advantageously a power steering force arrangement is additionally provided at the side of the output shaft.

In the rotational speed superposition device according to the invention, consequently, the entire control force or the entire moment is maintained countering or reinforcing on the input shaft or on the steering wheel. If need be, this is decreased through an additional power steering arrangement. The invented configuration has, however, the significant advantage that, although no additional steering force through the auxiliary drive is coupled into the system, the frictional losses in the device itself, in particular those in the harmonic drive gearing, are compensated by the auxiliary drive, such that the driver exclusively, or at least nearly exclusively, must exert the moment for steering action and not, or at least only to a very small degree—less than 10% of the losses—for the gearing losses in the rotational speed superposition device.

The present invention is structurally especially simple and built with few parts and thus permits the realization of an operationally reliable and economic configuration. In addition, an especially responsive steering behavior is made possible without the driver directly perceiving the onset of the rotational speed superposition device, such as for example through jerky or ripple-like counterforces on the steering wheel.

The various features of novelty which characterize the invention are pointed out with particularity in the claims annexed to and forming a part of this disclosure and are entirely based on the Swiss priority application no. 1704/04 filed Oct. 16, 2004.

BRIEF DESCRIPTION OF THE DRAWINGS

In the following the invention will be explained in further detail by example and with schematic Figures. Therein depict.

DESCRIPTION OF THE PREFERRED EMBODIMENTS

Figure 1:
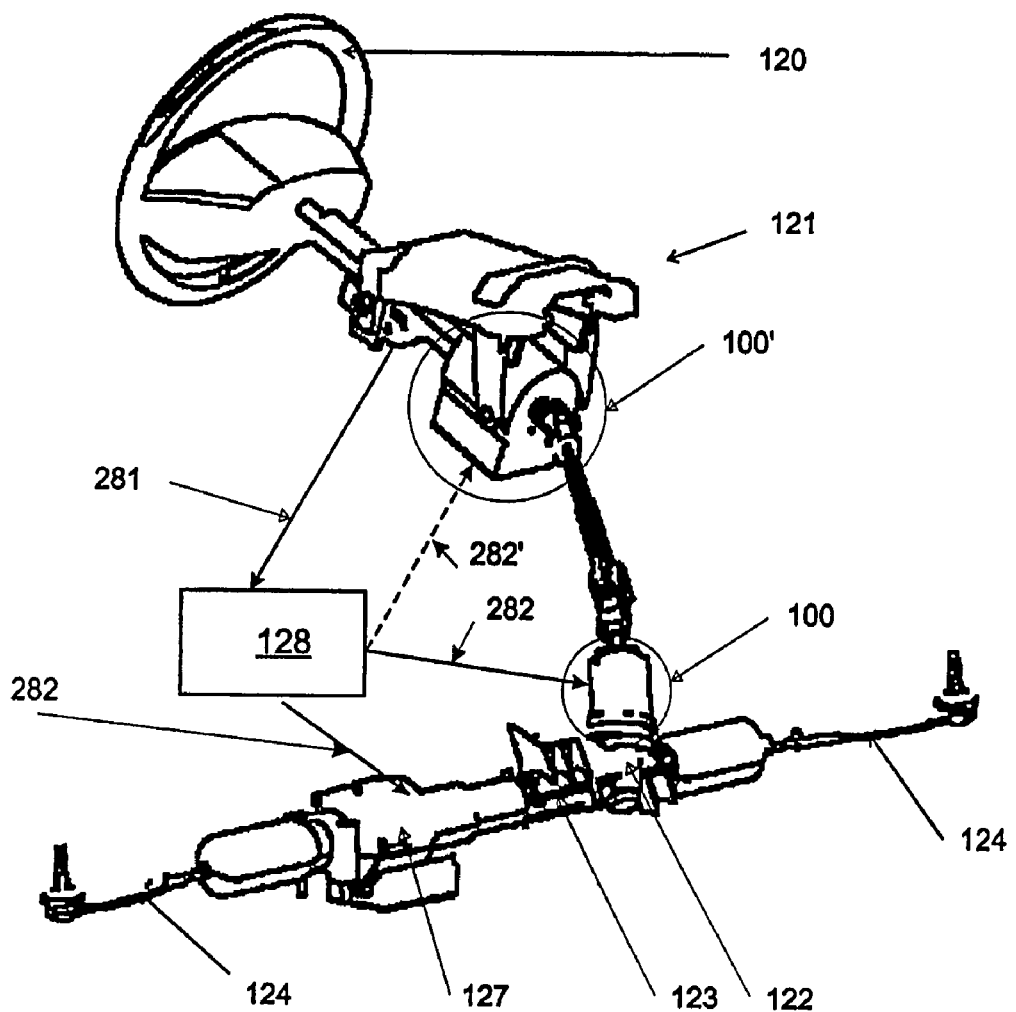
FIG. 1 schematically an overview of a vehicle steering system with incorporated rotational speed superposition device, FIG. 2 schematically and in section a rotational speed superposition device according to the invention, FIG. 3 schematically and in cross section a rotational speed superposition device according to FIG. 2, FIG. 4 schematically and in section a further embodiment of a rotational speed superposition device according to the invention, FIG. 5 schematically and in section an enlarged depiction of the rotational speed superposition device according to the invention in the region of the harmonic drive gearing, FIG. 6 an embodiment of the rotational speed superposition device with adjustable security coupler in perspective representation, FIG. 7 a rotational speed superposition device according to FIGS. 2 to 5 combined with an adjustable security coupler in longitudinal section, FIG. 8 schematically another structure of the security coupler.

FIG. 1 depicts a schematic structure of a steering mechanism 129 with auxiliary power assistance which substantially corresponds to prior art. It is inter alia comprised of a steering wheel 120, a steering column 121, a steering gearing 122 and two steering tie rods 124. The steering tie rods 124 are driven through the toothed rack 123. For the auxiliary power assistance serves the steering force assist 127 formed of components not to be further denoted here.

The invention relates to the superposition device 100 for the rotational speed superposition in the configuration in a steering mechanism for a motor vehicle. The driver's wish is herein fed as a signal 281 into a control apparatus 128 through the steering wheel 120 via a not shown sensor system. In the control apparatus therefrom and from further data, not further denoted here, the corresponding control voltage 283 for the electric motor of the steering force assist 127 and the control voltage 282 of the drive for the rotational speed superposition device 100 are determined and output to the steering force assist 127 or rotational speed superposition device 100. A responsive and fast regulation is therein required, which permits a taut steering system effecting low inertia and intrinsic vibration. It is possible to dispose the rotational speed superposition device 100 at different sites in the steering system. In FIG. 1 as an example a feasible alternative configuration of the rotational speed superposition device 100' with the alternative associated control voltage 282' is indicated. It is understood that other sites in the steering system are also feasible.

Figure 5:
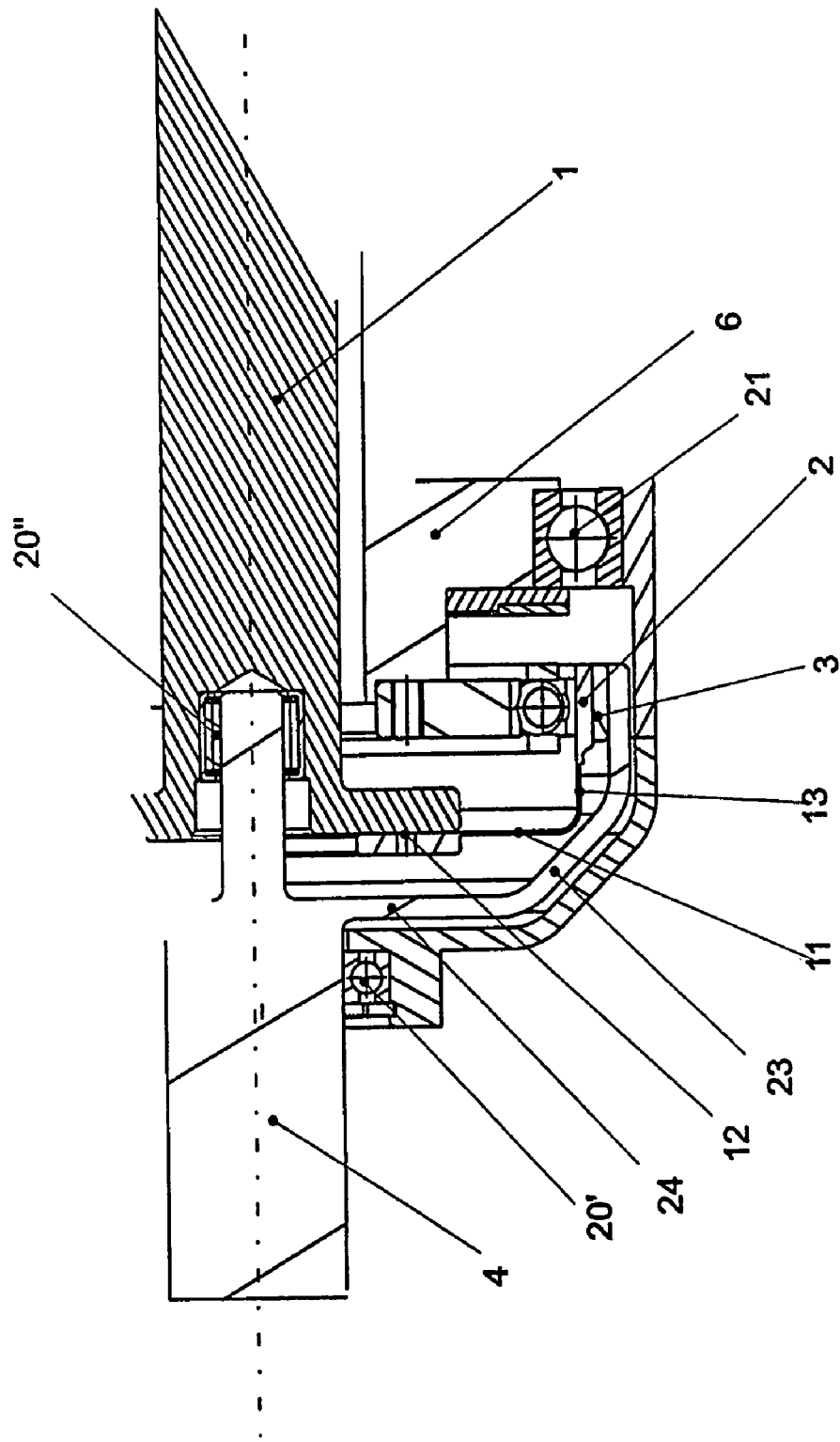

FIG. 2 depicts a rotational speed superposition device according to the invention in longitudinal section. An input shaft 1 and output shaft 4 are oriented in the axial direction with respect to one another and supported rotationally movable independently of one another. The input shaft 1 is operationally connected with a steering wheel 120 in a steering system. The support configuration 8 receives the bearings 20, 20' and 20" for the rotatable bearing of the input shaft 1 and the output shaft 4. These shafts 1, 4 can be supported completely on the support configuration or also additionally outside of the support configuration 8. The support configuration 8 is disposed stationarily on the chassis of the vehicle and rotates with neither of the two shafts 1, 4. The support configuration 8 is advantageously implemented as a substantially closed housing 8. Coaxially about the input shaft 1 opposite the housing 8 is disposed a rotor 6 rotatable with a bearing 21 which is driven by the stationarily disposed encompassing stator 7 and together with it forms an electric motor. This motor is preferably implemented as an electronically commutated motor. However, this auxiliary drive 6, 7 can also be of a different type, such as for example a hydraulic motor. On rotor 6 is disposed a wave generator 5, which is comprised for example of an oval disk, on whose periphery directly or indirectly a flexible ring 2 with outer toothing is supported and which forms a first gearing element. This outer toothing engages at least at two opposing circumferential points into an internal gear wheel 3. This internal gear wheel 3 is connected torsion tight with the output shaft 4, wherein the input shaft 1 is connected torsion tight with the flexible ring 2 with outer toothing. In FIG. 5 this gearing configuration is depicted more clearly at an enlarged scale. The present implementation of the rotational speed superposition device effects that when the auxiliary drive 6, 7 is not being operated, no rotational speed superposition onto the output shaft 4 takes place and the input shaft 1 is coupled 1:1 with the output shaft 4 via the gearing configuration. In this case, consequently, the rotational movement of the steering wheel 120 or of the input shaft 1 is transmitted directly, without rotational speed change, onto the output shaft 4 and thus onto the steering gearing 122. If the auxiliary drive 6, 7 is set into motion, according to the signals of the driving electronic circuitry of the control apparatus 128, the rotor 6 is set into motion and its rotational speed, correspondingly reduced, is superimposed onto the output shaft 4 via the above described harmonic drive gearing. The rotational speed behavior of the steering mechanism can thus be adjusted via the present rotational speed superposition device according to the driving situation and the driving requirements with the aid of the control apparatus 128 and be made to track them.

In an advantageous further development the flexible ring 2 is developed in the form of a pot and with its bottom surface 11 connected torsion tight directly with the input shaft 1 or, in an alternative embodiment, with the output shaft 4, preferably even through a simple sealing 12 or riveting 12 or through a welding connection 12 of the bottom thus formed with the input shaft 1 or, in an alternative embodiment, with the output shaft 4, as is also evident in detail in the cross sectional depiction of FIG. 3.

Figure 4:
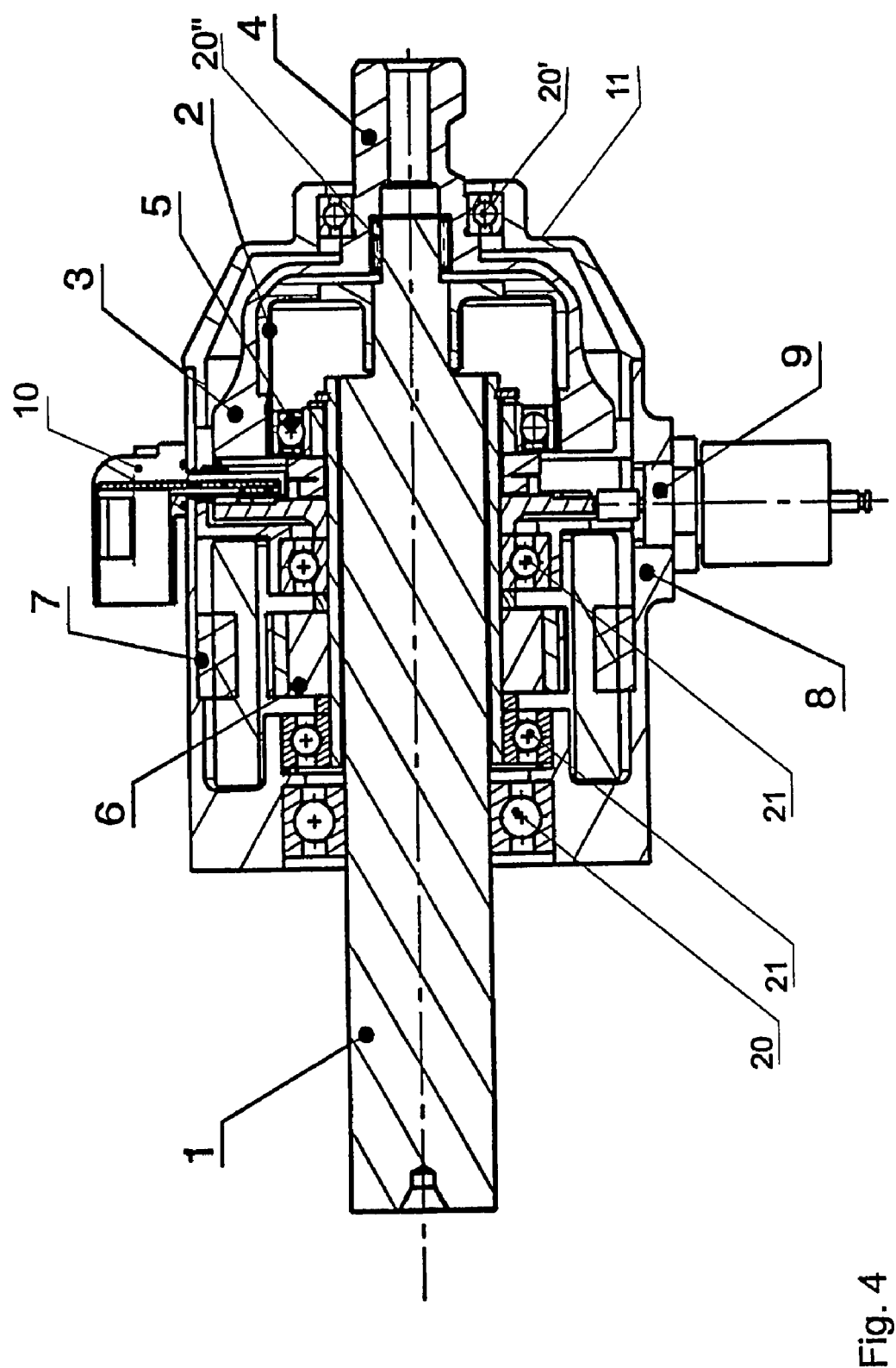

In an alternative embodiment it is also possible to exchange the input and the output shaft with one another in the configuration. In this case the input shaft 1 is connected torsion tight with the internal gear wheel 3 and the output shaft 4 is connected torsion tight with the flexible ring 2 having outer toothing. A further development of the configuration according to the invention with different positioning of the functional elements is depicted in FIG. 4. However, the fundamental function of the present invention remains the same.

The internal gear wheel 3, whose gear ring is preferably circular, can be developed integrally with the output shaft 4 or as a separate part which is connected with the output shaft 4 through plastic deformation joining, analogous to clinching, or through welding or soldering with the output shaft or by a friction-closure connection. In especially advantageous manner the internal gear wheel is developed in the form of a pot. In this case such an internal gear wheel is produced for example through sheet metal forming and stamping operations and at its pot bottom 24 is connected torsion tight with the output shaft.

To acquire the rotational angle state of the configuration, a rotational angle sensor 10 is advantageously provided, which is connected with a control apparatus 128, which, in turn, acts onto the auxiliary drive 6, 7 for the adjustment of the desired rotational speed superposition behavior of the steering mechanism. The sensor 10 can herein acquire positions of the rotor 6, of the input shaft 1 or of the output shaft 4. Depending on the selected control algorithm, herein one of the signals or also the combination of the signals can be processed.

For reasons of security, a mechanical locking mechanism 9 is provided with advantage, which makes it possible to block the rotor 6 with the aid of a pin in the event of a fault. As depicted in FIG. 2 and FIG. 4, the locking mechanism 9 is comprised therein that a pin in the event of a fault engages into a bore of the rotor 6 and therewith blocks it. The locking mechanism 9 is implemented such that in normal operation the pin is retracted, for example electromagnetically, and in the event of a fault, thus also in power failure, the pin is driven through spring force into the blocking position.

As shown in FIG. 2 and FIG. 5, the flexible toothed ring 2 is developed in the form of a pot and with its bottom surface 11 is connected torsion tight with the input shaft 1 or the output shaft 4. For noise reduction of the gearing configuration the flange 13 of the pot of the flexible toothed ring 2 can advantageously be enlarged or the pot 11, 13 can also be developed to be softer. Between the fastening element 12 of the pot and the input shaft 1 additional intermediate rubber or synthetic pieces can be disposed for further damping. A further feasibility for reducing the transmission of the structure-borne noise comprises fastening the housing 8 with rubber or synthetic elements appropriately on the vehicle body. Analogously, the flange 23 of the internal gear wheel 3 can also be flexible and the internal gear wheel 3 be fastened at its bottom 24 with intermediate rubber or synthetic pieces on the input shaft 4 for noise damping.

The rotational speed superposition device according to the invention can be structured extremely compactly, for example with an outer diameter of less than 80 mm and a length of less than 100 mm and this can be done with extremely high reliability in operation.

As already explained, for different applications integrating a security coupler into the rotational speed superposition device is provided. In the event of a malfunction, for example of a sensor error, a software error or a power failure of the on-board voltage, which, accordingly, would lead to an error in the driving of the auxiliary drive, the task of this security coupler comprises establishing the secure coupling between input shaft 1 and output shaft 4. Apart from the solution already introduced for such a security coupler or also locking mechanism 310, in FIGS. 6 to 11 a further embodiment is shown for a secure coupling with several variants. This further development of the invention yields additional advantages.

Figure 6:
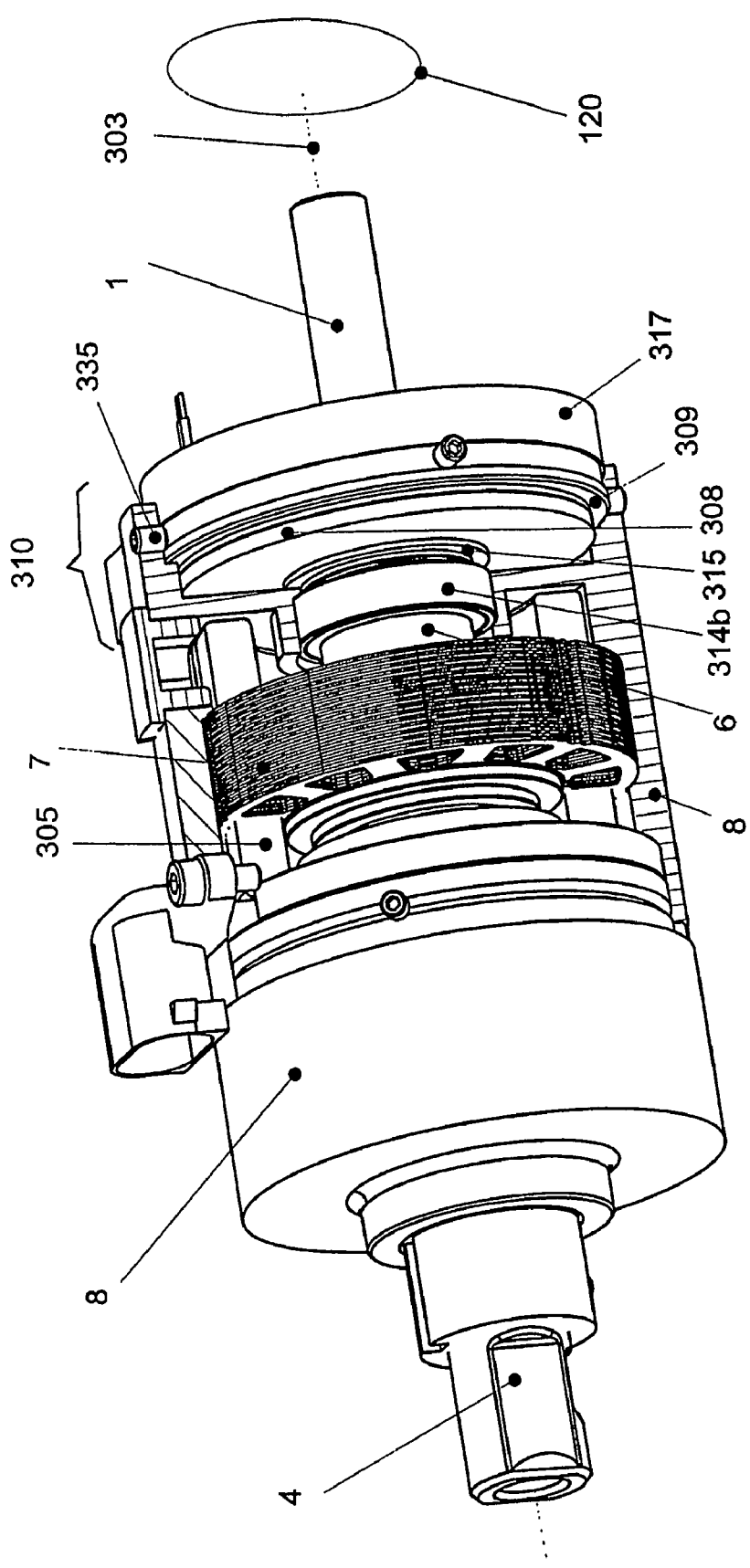
Figure 7:
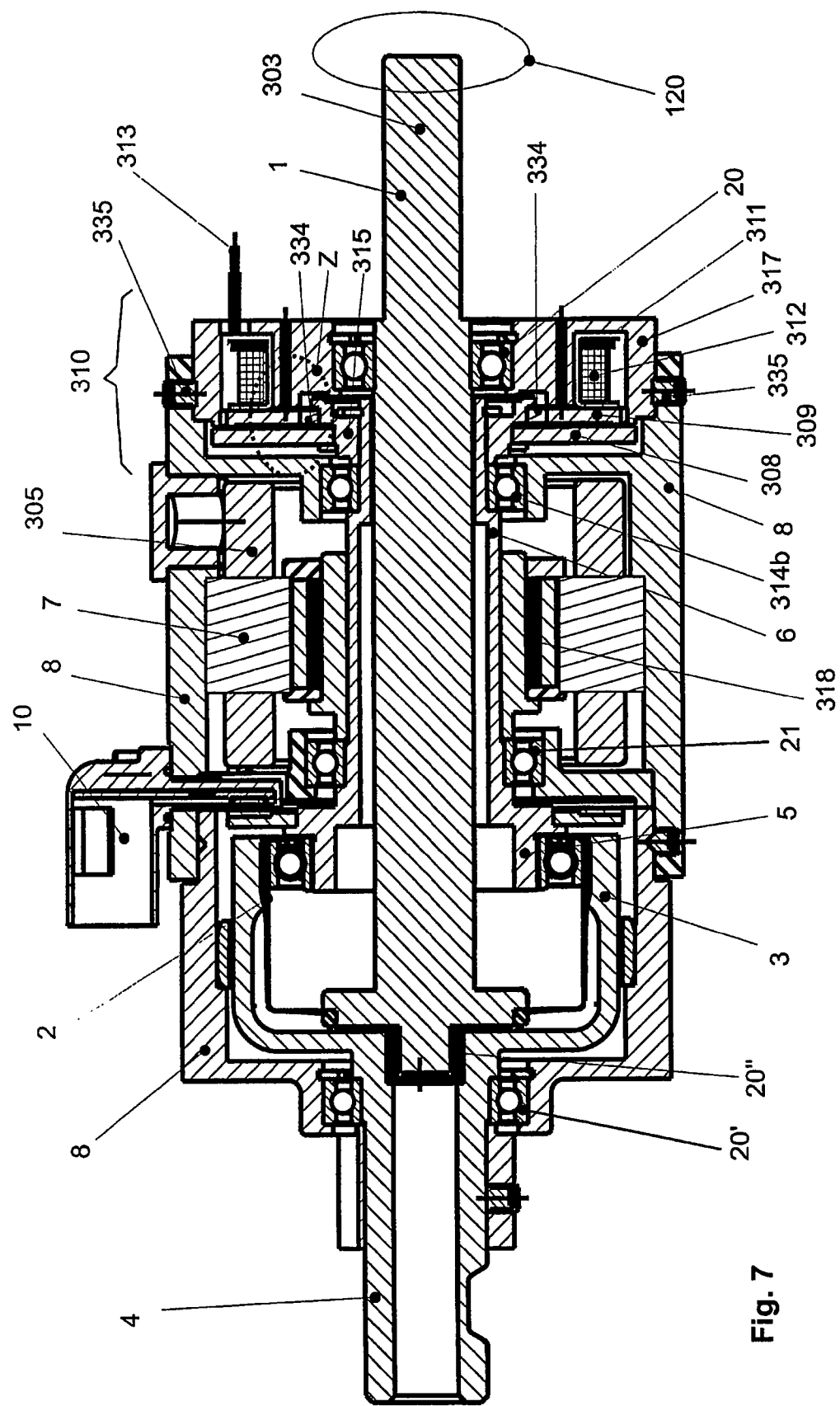

FIG. 6 shows schematically and in three-dimensional view an invented rotational speed superposition device, as already described in the preceding FIGS. 2 to 5, combined with a preferred adjustable locking mechanism or security coupler configuration 310, wherein in FIG. 7 the device is shown in cross section and in greater detail. A further development of the invention for the rotational speed superposition device for a vehicle steering system with an output shaft 4, which, with respect to the input shaft 1 is oriented in its axial direction 303, a support configuration 8, which positions the output shaft 4 and the input shaft 1, at least partially bearing supported such that it is rotatable, an auxiliary drive 305, 6, 7 with a rotor 6, which is connected torsion tight with a first gearing element 5, the wave generator, and a locking mechanism 310 for the optional torsion tight coupling between output shaft 1 and input shaft 4, provides that the support configuration 8 is disposed torsion tight with respect to the vehicle body, the rotor of the auxiliary drive 305, 6, 7 encompasses coaxially the output shaft 4 and/or input shaft 1, the first gearing element 5 with a rotational speed transmission less than 1 transmits the rotational speed of rotor 6 onto the rotational speed of the output shaft 4, and the rotor is connected torsion tight with a ferromagnetic or permanent magnetic first contact element 308 encompassing concentrically the axial direction of the output shaft 4 and input shaft 1, wherein the torsion-tight coupling between output shaft 4 and input shaft 1 is achieved through a frictional closure of the first contact element 308 with a second contact element 309, which is connected torsion tight with the support configuration 8, and the press-on force required for the frictional force is generated by a magnetic force and wherein at least one of the two contact elements 308, 309 is displaceable in the axial direction.

One and/or both contact elements in all embodiments can advantageously be alternatively disks and/or elements with areal segments which are developed with corresponding conical or arcuate surfaces. The contact face is thereby increased at identical diameter and a centering function can also be achieved.

With respect to one another, the input shaft 1 and output shaft 4 are oriented in an axis 303.

In the depicted embodiment on the rotor 6 of auxiliary drive 305, 6, 7 a coupling element 315 is located, which supports the first contact disk 308 such that it is axially displaceable and transmits the torque. The rotor 6, coaxially encompassing the input shaft 1, of the auxiliary drive is rotatably supported in a roller bearing 314b in the support configuration 8, which is here implemented as a housing. The elements of the locking mechanism 310 can be comprised as an assembly group in a separate subhousing 317, which is produced separately and is mechanically connected with the support configuration 8. This connection can be produced simply via a threaded joint connection into an internal threading, not shown here, of the support configuration 8 or via machine screw connections 335.

In the preferred case the auxiliary drive 305, 6, 7 is laid out as an electric motor whose stator 7 is fixedly connected with the support configuration 8. Depending on the embodiment of the gearing, the stator 7 encompasses coaxially the axis 303 of the input shaft 1 and/or output shaft 4. The stator 7 carries the stator windings 305. The rotor of the electric motor is equipped with permanent magnets and is set into rotation under appropriate current supply of the stator windings 305. The electric motor is accordingly completely integrated into the rotational speed superposition device, whereby a highly compact and energy efficient layout is attained. The motor is laid out such that it can be driven to rotate in both directions of rotation. Due to the connection of the rotor with a gearing member of the superposition gearing, whose rotational speed with a rotational speed transmission of less than 1 is transmitted to the output shaft 1, the electric motor can be driven with higher rotational speed. Transmission ratios of more than 1:20 or even more than 1:50 are especially advantageous. This means that more than 20 or 50 rotor revolutions correspond to 1 revolution of the output shaft if the rotational speed of the input shaft has the value 0.

Contact elements 308, 309 are preferably produced as circular disks of steel or another ferromagnetic material. However, the disks may also be discontinuous or be apertured which serves, for example, for better venting when opening and closing the two contact disks. In the embodiment example the first contact disk 308 is connected torsion tight yet axially displaceably via a coupling element 315 with the rotor 6 of the auxiliary force device 305, 6, 7.

In the simplest case the magnetic press-on force is generated by a permanent magnet 311. The permanent magnet 311 can be developed as a cylindrical disk, whose axis coincides with the axis 8 of the input shaft 1 or the output shaft 4. However, several individual permanent magnets can also be applied on a cylindrical disk. Furthermore, for the sake of simplicity, each feasible embodiment is denoted by the permanent magnet 311.

The first contact element 308 is attracted to the second contact element 309 by the magnetic field of a permanent magnet 311. The subhousing 317 as well as a corresponding armature implementation ensure the magnetic closure. The face contact pressing between the two contact elements 308, 309 serves as frictional closure. To improve the frictional force, one or both of the contact elements 308, 309 may be coated with appropriate friction lining. While a positive locking surface structure of the two contact elements 308, 309 would be obvious and conceivable, it does however entail a number of disadvantages. In particular, in this case locking is no longer possible for each relative rotational angle between the two contact elements 308, 309. In addition, increased wear must be assumed. In particular, the braking of a potentially still existing rotation of the rotor 6 is hardly possible. Nevertheless, such a solution can be desirable in the individual case.

During locking, the contact elements 308, 309 are in frictional contact with one another, whereby the rotor 6 is blocked with respect to the support structure 8. Rotor 6 is further connected with a first gearing element 5 or with the wave generator, which is therewith also blocked with respect to the support structure 8 disposed torsion tight with respect to the vehicle body. Consequently, the entire torque, which is introduced into the input shaft 1, is thus transmitted to the output shaft 4. Accordingly, the rotational speed of the input shaft is transmitted onto a rotational speed on the output shaft. The function of the torsion tight coupling between input shaft 1 and output shaft 4 is therewith achieved. This case is important for the extreme case or also when the drive motor of the motor vehicle is switched off. In this operating state the driver has the sole control over the steering of the driving direction and the steering wheel is mechanically coupled with the turning wheels. This is important in cases of deficient energy supply of the auxiliary drive, such as for example in power failures or also in malfunction of the driving of the auxiliary drive. In order to detect such malfunctions, for example sensors 10 can be integrated into the rotational speed superposition device, which make possible the monitoring of the various rotational speeds or rotational angles at input shaft 1, output shaft 4 and rotor 6.

During unlocking, in which the rotational speeds or rotational angles are to be changeable with respect to one another, the contact elements 308, 309 are brought out of frictional contact preferably through a small distance from one another. The auxiliary drive is simultaneously supplied with energy such that it assumes the reinforcing of the torque introduced by the input shaft 1. If necessary, the rotor 6 is preferably set into rotation through the auxiliary drive in order to attain the corresponding rotational speed or rotational angle superposition between input shaft 1 and output shaft 4.

It is especially advantageous for increasing the reliability, if in the event of unlocking during failure of the energy supply at auxiliary drive 305, 6, 7 switching to locking, in which output shaft 4 and input shaft 1 are coupled torsion tight, takes place quasi automatically. Additional current effecting the coupling should not be required. This process should moreover take place such that it is as much as possible imperceptible to the driver.

For this purpose the unlocking should preferably be effected by a current flow, while without this current flow, the system locks automatically. In a further development of the invention this is attained thereby that the magnetic press-on force between the first and second contact element can be cancelled through an electrically activated countermagnetic field. In the simplest case this countermagnetic field is generated by an encircling coil 312 which is driven via an electric connection 313. The coil 312 in the embodiment example is disposed between the permanent magnet 311, which effect the magnetic press-on force, and the contact disk 309. When the coil 312 is appropriately under current, the magnetic circuit between the permanent magnet 311 closes, such that onto the first contact disk 308 no, or only a very weak, attractive force acts in the direction of the second contact disk 309. Therewith the frictional force between the two contact disks, which in the embodiment example represents the contact element, falls, such that the locking mechanism 310 is unlocked. During a failure of the power supply of coil 312 the countermagnetic field collapses immediately so that the magnetic force of the permanent magnet 311 acts directly onto the contact disk 308 and pulls it to the contact disk 309.

Figure 11:
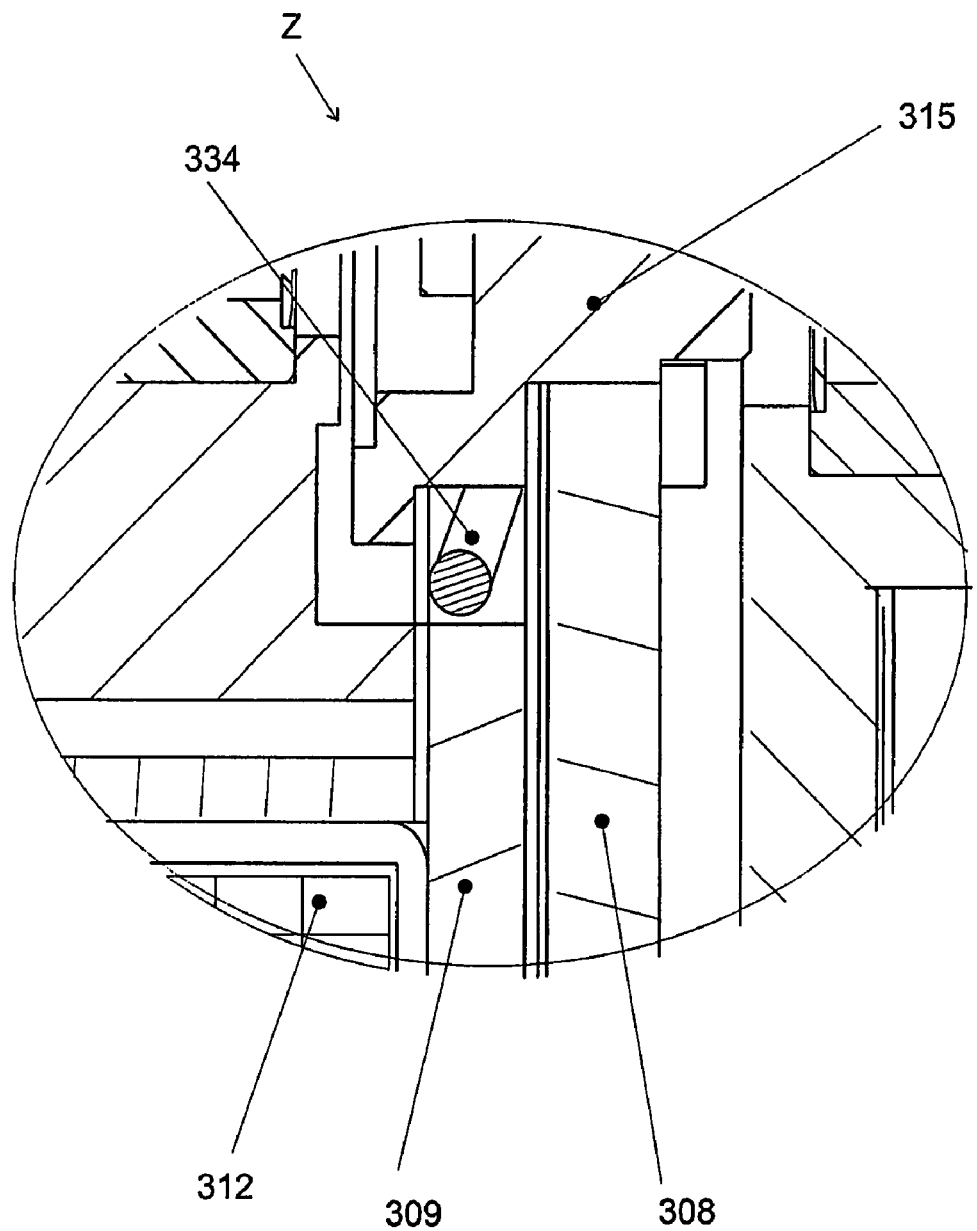

In a further development the energy expenditure for maintaining the unlocked state of the locking mechanism 310 is to be lowered. For this purpose the locking mechanism 310 comprises a spring 334, whose force acts counter to the magnetic press-on force, as is also depicted in FIG. 11. In the embodiment example the axially displaceable contact disk 308 is pressed away from the permanent magnet 311 by means of a spring 334. With increasing distance of the contact disk from the field of the permanent magnet 311 the attractive force decreases such that the countermagnetic field only needs to be weaker in order to cancel its effect.

However, for locking the locking mechanism 310 through the magnetic force of the permanent magnet 311 the spring force must be overcome. To this end in a further development of the invention the spring force is laid out such that it is defined. In the preferred case the spring force is so dimensioned that the force, acting onto the first axially movable contact disk 308 away from the other contact disk 309 in the state canceled by the first contact disk, lies in the range of slightly greater than zero to 10% of the magnitude of the magnetic force of the magnetic field which generates the press-on force. Thereby, for the maintenance of the unlocked state of the locking mechanism 310, there is only a very low power requirement for the countermagnetic field. The reliable closing of the locking mechanism is simultaneously ensured. As soon as the contact disks 308, 309 move toward one another, the magnetic force acting onto the movable contact disk 308 increases such that the requisite high frictional force is generated. With the dimensioning of the spring, the bouncing during the impacting of the two contact disks is reduced. The power requirement, which is minimally higher for a short time, for unlocking the locking mechanism 310 is more than compensated by the saving during the entire length of the maintenance of the unlocked state.

The locking mechanism 310 can very well and compactly be integrated into the rotational speed superposition device. For this purpose the rotor 6, on the one hand, is preferably directly rotatably supported 314*b* in the support configuration 8 and the input shaft 1 is rotatably supported 20 in the portion of the locking mechanism 310 fixedly connected with the support configuration which encompasses the second contact disk. The other end of the input shaft 1 is especially advantageously supported directly in the output shaft 4.

With the aid of the device, structured according to said characteristics, a rotational speed superposition device with a reliability redundancy for the steering against failure of the on-board supply voltage or other faults is given, which very quickly and reliably establishes the mechanical coupling between the steering wheel and the steered wheels. In the event of failure of the energy supply of the auxiliary drive 305, 6, 7 or another fault of the functions of the vehicle, the current flow for operating the counter magnetic field to cancel the magnetic press-on force is interrupted, such that the first contact element 308 is in contact with the second contact element 309 under frictional closure with the magnetically generated press-on force.

Figure 8:
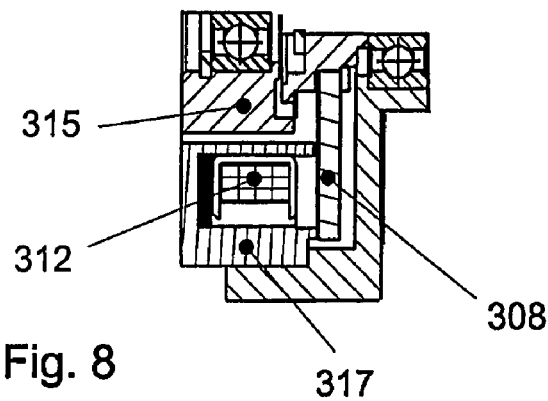
Figure 9:
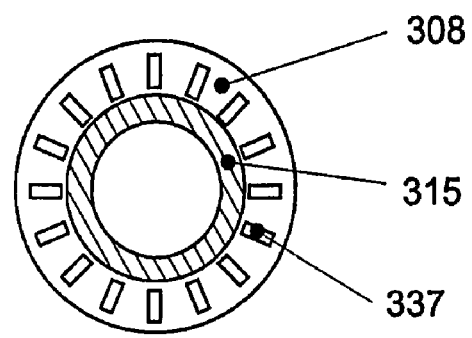
FIG. 9 and FIG. 10 show two embodiments of the contact disk, FIG. 11 a detail view through the locking mechanism corresponding to the segment Z from FIG. 7.
Figure 10:
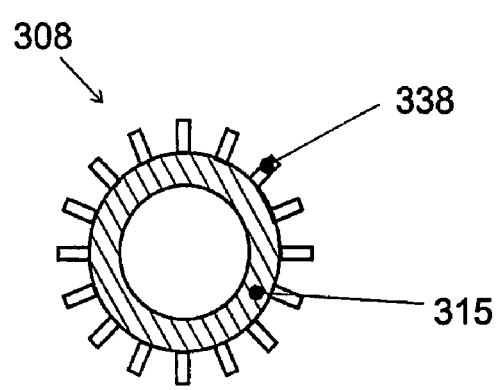

In FIG. 8 an alternative embodiment for the security coupler is depicted, in which the first contact element, the contact disk 308, is brought directly into contact with the subhousing 317 implemented as a yoke. The second contact element is here to be seen as a component part of the subhousing 317.

The contact disk 308 in all embodiments can be laid out as a cylindrical disk. However, for better venting during the closing of the two contact faces, it is of advantage to lay out the contact disk 308 with corresponding cutouts 337 (cf. FIG. 9). Alternatively, it is also possible for a number of contact elements 338 (cf. FIG. 10) to be directly connected with the coupling element 315. The form of the cutouts 337 or contact elements 338 of the contact disk 308 is to be adapted to the particular structural conditions. It is important that a sufficient magnetic attractive force to the second contact disk 309 or directly to the subhousing 317, which, on its surface directed toward the contact disk 308, itself may have an appropriate frictional lining, is attained.

Even if in all embodiments roller bearings are shown, it is conceivable and feasible to utilize slide bearings. While in general lower frictional values are attained with roller bearings, slide bearings are more cost-effective and require less installation space. A decision is made according to the requirements of installation space and energy use for the auxiliary drive.

The introduced rotational speed superposition device is operated in vehicle steering systems in such manner that, in the event of a failure of the energy supply of the auxiliary drive or another fault of the functions of the vehicle, the current flow for operating the countermagnetic field for cancelling the magnetic press-on force is interrupted, such that the first contact disk 308 is in frictional closure contact with the second contact disk 309 with the magnetically generated press-on force. Thereby the torsion tight coupling between the input shaft 1 and the output shaft 4 is achieved immediately. In this case it is desirable to establish the coupling within the shortest possible time and as imperceptibly for the driver as possible. Apart from the energy failure of the energy supply of the auxiliary drive or in the vehicle, as a case of error are also conceivable a sensor failure, a problem with the driving system or a software error or other errors. For example, through a simple cable break the measured value of the speed of the vehicle can no longer be transmitted correctly to the control of the superposition regulation. Therewith the control can no longer decide with which rotational speed superposition the device is to be operated. In such a case, which is readily detectable, sufficient energy is available to attain actively the torsion tight coupling between output shaft 4 and input shaft 1.

In a preferred further development of the invention the coil for the countermagnetic field, with which the magnetic field of the permanent magnet 311, which effects the locking mechanism 310 for the optional torsion tight coupling between output shaft 4 and input shaft 1, is canceled, is at least periodically switched such that the magnetic press-on force between the two contact disks 308, 309 is increased. The accelerated closure of the locking mechanism is thereby effected. When the torsion tight coupling of the output shaft 4 and the input shaft 1 is attained, the current supply of coil 312 for the countermagnetic field can be switched off.

The invention claimed is:

1. Rotational speed superposition device for a vehicle steering system with:
   an output shaft (4), which with respect to the input shaft (1) is oriented in its axial direction,
   a support configuration (8), which positions rotatably the input shaft (1) and the output shaft (4) at least partially bearing supported,
   an auxiliary drive (6, 7) with a rotor (6), which is connected torsion tight with a wave generator (5), such as an oval disk, on whose periphery a flexible ring (2) with outer-toothing is directly or indirectly supported, wherein its outer toothing meshes at least at two opposing circumferential points with an internal gear wheel (3),
   characterized in that the support configuration (8) is disposed stationarily on the vehicle body, the output shaft (4) is connected torsion tight with the internal gear wheel (3), the input shaft (1) is connected torsion tight with the flexible ring (2) with outer toothing, that the input shaft (1) and the output shaft (4) are supported freely rotatably independently of one another and that an adjustable locking mechanism (9) is provided for the optional blocking of the turning out of position of the rotor (6) with respect to the support configuration (8).

2. Rotational speed superposition device as claimed in claim 1, characterized in that the flexible ring (2) is developed in the form of a pot and its bottom surface (11) is connected torsion tight with the input shaft (1) or the output shaft (4).

3. Rotational speed superposition device as claimed in claim 1, characterized in that the support configuration (8) is implemented as a housing.

4. Rotational speed superposition device as claimed in claim 1, characterized in that the auxiliary drive (6, 7) is implemented as an electric motor, preferably as an electronically commutated motor.

5. Rotational speed superposition device as claimed in claim 1, characterized in that the flexible ring (2) with outer toothing and the internal gear wheel (3) of the harmonic drive are not disposed torsion tight with respect to the support configuration (8) or the vehicle body.

6. Rotational speed superposition device as claimed in claim 1, characterized in that rotor (6) and stator (7) of the auxiliary drive are disposed coaxially with the input shaft (1) or output shaft (4).

7. Rotational speed superposition device for a vehicle steering system with:
   an output shaft (4), which with respect to the input shaft (1) is oriented in its axial direction,
   a support configuration (8), which positions rotatably the input shaft (1) and the output shaft (4) at least partially bearing supported,
   an auxiliary drive (6, 7) with a rotor (6), which is connected torsion tight with a wave generator (5) such as an oval disk, on whose periphery a flexible ring (2) with outer toothing is directly or indirectly supported, wherein its outer toothing meshes at least at two opposing circumferential points with an internal gear wheel (3),
   characterized in that the support configuration (8) is disposed stationarily on the vehicle body, the input shaft (1) is connected torsion tight with the internal gear wheel (3), the output shaft (4) is connected torsion tight with the flexible ring (2) with outer toothings, that the input shaft (1) and the output shaft (4) are supported freely rotatably independently of one another and that an adjustable locking mechanism (9) is provided for the optional blocking of the turning out of position of the rotor (6) with respect to the support configuration (8).

8. Rotational speed superposition device as claimed in claim 7, characterized in that the flexible ring (2) is developed in the form of a pot and its bottom surface (11) is connected torsion tight with the input shaft (1) or the output shaft (4).

9. Rotational speed superposition device as claimed in claim 7, characterized in that the support configuration (8) is implemented as a housing.

10. Rotational speed superposition device as claimed in claim 7, characterized in that the auxiliary drive (6, 7) is implemented as an electric motor, preferably as an electronically commutated motor.

11. Rotational speed superposition device as claimed in claim 7, characterized in that an angle sensor (10) is provided for acquiring the rotational speed superposition and acquires at least one of the signals at the rotor (6), at the input shaft (1) or at the output shaft (4) and that the sensor is connected with a control apparatus (128) for driving the auxiliary drive (6, 7).

12. Rotational speed superposition device for a vehicle steering system with:
   an output shaft (4), which with respect to the input shaft (1) is oriented in its axial direction,
   a support configuration (8), which positions rotatably the input shaft (1) and the output shaft (4) at least partially bearing supported, an auxiliary drive (6, 7) with a rotor (6), which is connected torsion tight with a wave generator (5), such as an oval disk, on whose periphery a flexible ring (2) with outer toothing is directly or indirectly supported, wherein its outer toothing meshes at least at two opposing circumferential points with an internal gear wheel (3), characterized in that the support configuration (8) is disposed stationarily on the vehicle body, the output shaft (4) is connected torsion tight with the internal gear wheel (3), the input shaft (1) is connected torsion tight with the flexible ring (2) with outer toothing, that the input shaft (1) and the output shaft (4) are supported freely rotatably independently of one another and that the device comprises a locking mechanism (9, 310), which, in the event of fault, locks torsion tight the rotor (6) with the stator (7) and/or the support configuration (8).

13. Rotational speed superposition device as claimed in claim 12, characterized in that the rotor (6) is connected torsion tight with a ferromagnetic or permanent-magnetic contact element (308) concentrically encompassing the axial direction of the output shaft (4) and input shaft (1), wherein the optional torsion tight coupling between output shaft (4) and input shaft (1) is attainable through frictional closure of the first contact element (308) with a second contact element (309), which is connected torsion tight with the support configuration (8), and the press-on force required for the frictional force is generated through a magnetic force and wherein at least one of the two contact elements (308, 309) is displaceable in the axial direction.

14. Rotational speed superposition device for a vehicle steering system with:
    an output shaft (4), which with respect to the input shaft (1) is oriented in its axial direction,
    a support configuration (8), which positions rotatably the input shaft (1) and the output shaft (4) at least partially bearing supported,
    an auxiliary drive (6, 7) with a rotor (6), which is connected torsion tight with a wave generator (5) such as an oval disk, on whose periphery a flexible ring (2) with outer toothing is directly or indirectly supported, wherein its outer toothing meshes at least at two opposing circumferential points with an internal gear wheel (3),
    characterized in that the support configuration (8) is disposed stationarily on the vehicle body, the input shaft (1) is connected torsion tight with the internal gear wheel (3), the output shaft (4) is connected torsion tight with the flexible ring (2) with outer toothings, that the input shaft (1) and the output shaft (4) are supported freely rotatably independently of one another and that the device comprises a locking mechanism (9, 310), which, in the event of fault, locks torsion tight the rotor (6) with the stator (7) and/or the support configuration (8).

15. Rotational speed superposition device as claimed in claim 14, characterized in that the rotor (6) is connected torsion tight with a ferromagnetic or permanent-magnetic contact element (308) concentrically encompassing the axial direction of the output shaft (4) and input shaft (1), wherein the optional torsion tight coupling between output shaft (4) and input shaft (1) is attainable through frictional closure of the first contact element (308) with a second contact element (309), which is connected torsion tight with the support configuration (8), and the press-on force required for the frictional force is generated through a magnetic force and wherein at least one of the two contact elements (308, 309) is displaceable in the axial direction.

16. Rotational speed superposition device as claimed in claim 14, characterized in that rotor (6) and stator (7) of the auxiliary drive are disposed coaxially with the input shaft (1) or output shaft (4).

17. Rotational speed superposition device for a vehicle steering system with:
    an output shaft (4), which with respect to the input shaft (1) is oriented in its axial direction,
    a support configuration (8), which positions rotatably the input shaft (1) and the output shaft (4) at least partially bearing supported,
    an auxiliary drive (6, 7) with a rotor (6), which is connected torsion tight with a wave generator (5), such as an oval disk, on whose periphery a flexible ring (2) with outer toothing is directly or indirectly supported, wherein its outer toothing meshes at least at two opposing circumferential points with an internal gear wheel (3),
    characterized in that the support configuration (8) is disposed stationarily on the vehicle body, the output shaft (4) is connected torsion tight with the internal gear wheel (3), the input shaft (1) is connected torsion tight with the flexible ring (2) with outer toothing that the input shaft (1) and the output shaft (4) are supported freely rotatably independently of one another and that an angle sensor (10) is provided for acquiring the rotational speed superposition and acquires at least one of the signals at the rotor (6), at the input shaft (1) or at the output shaft (4) and that the sensor is connected with a control apparatus (128) for driving the auxiliary drive (6, 7).

* * * * *